Figure 5:
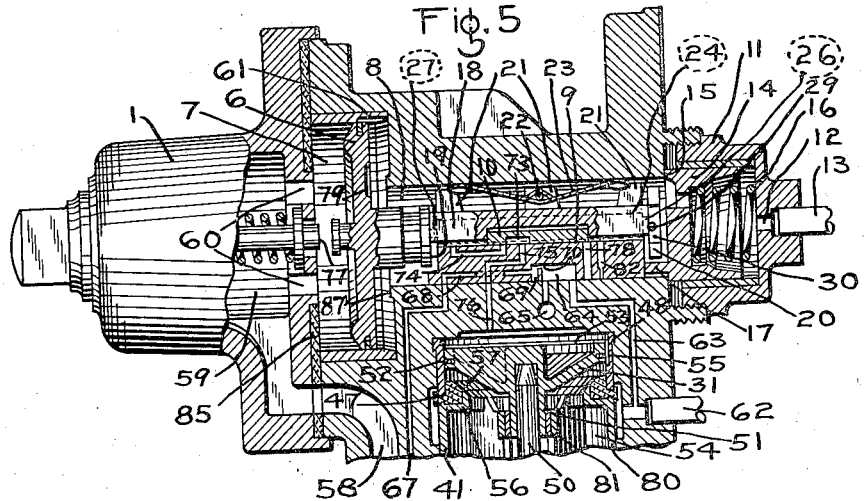

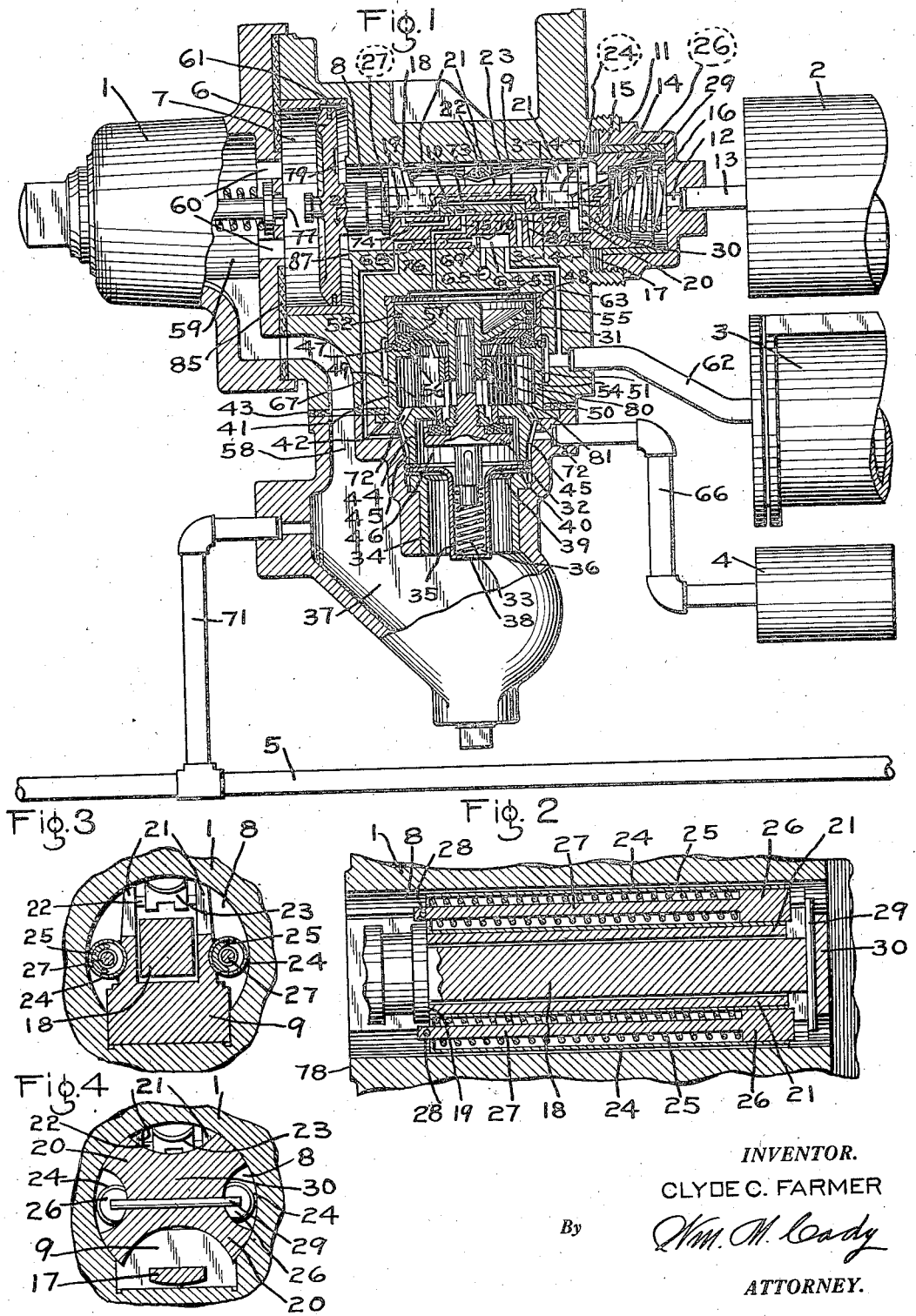

March 17, 1936.  C. C. FARMER  2,034,289

TRIPLE VALVE DEVICE

Original Filed July 25, 1931  2 Sheets-Sheet 2

INVENTOR.
CLYDE C. FARMER

By *Wm. M. Cady*

ATTORNEY.

Patented Mar. 17, 1936

2,034,289

UNITED STATES PATENT OFFICE 2,034,289

TRIPLE VALVE DEVICE

Clyde C. Farmer, Pittsburgh, Pa., assignor to The Westinghouse Air Brake Company, Wilmerding, Pa., a corporation of Pennsylvania Application July 25, 1931, Serial No. 553,064
Renewed December 18, 1935

16 Claims. (Cl. 303—38)

This invention relates to fluid pressure brakes and more particularly to the well known automatic fluid pressure brake system in which the brakes are applied by effecting a reduction in brake pipe pressure and are released by effecting an increase in brake pipe pressure.

With the increase in train lengths, the difficulty of applying and releasing the brakes without causing excessive shocks has correspondingly increased due to the running in of the slack before the brakes are applied on the rear cars of the train, and the running out of the slack before the brakes are released on the rear cars.

In actual service, difficulty is encountered in causing all brakes to apply on long trains, because of the slow rate of brake pipe reduction, due to the length of the brake pipe, and to the auxiliary reservoirs of the brake equipment discharging fluid into the brake pipe through the feed grooves, and due to the fact that the brakes apply slowly because of the increased brake pipe air to be discharged at the brake valve, so that excessively heavy reductions in brake pipe pressure must be made to ensure that all brakes will apply, especially when the brake pipe leakage is of a minimum amount. Consequently, shocks are produced, not only because of the slow serial application of the brakes, but also because the brakes apply non-uniformly in degree of brake force.

The principal object of my invention is to provide an improved equipment by which the brakes on a long train can be applied with certainty and without causing excessive shocks.

According to my invention, yielding resilient means are associated with the main slide valve of the triple valve device in such a manner, that after the piston and graduating valve move upon a light reduction in brake pipe pressure to close the usual feed groove, said means act on the piston so as to require a further and predetermined reduction in brake pipe pressure for causing said piston to move the usual graduating valve to quick service position.

According to my improvements, the initial movement of the triple valve piston closes the usual feed groove and shifts the graduating valve, such movement being effected upon a light reduction in brake pipe pressure and resisted only by the friction of the piston and graduating valve. Further movement to quick service position is resisted by means associated with the main slide valve and is effected upon a light but predetermined and definite reduction in brake pipe pressure such as a one pound reduction in brake pipe pressure. In the quick service position, a local venting of fluid from the brake pipe is effected without moving the main slide valve of the triple valve device, thus causing similar quick serial, service operation of all of the triple valve devices throughout the train, each in advance of the application of brakes on each car in the train.

As a result of this quick service action, a limited and sharp brake pipe reduction is rapidly transmitted throughout the train, which causes the triple valve pistons to first positively close the feed grooves before any appreciable back flow from the auxiliary reservoirs to the brake pipe can occur, and then the triple valve pistons are moved out to quick service position, thus initiating an application of the brakes.

When the triple valve piston and slide valves move to service application position, and after the quick service reduction in brake pipe pressure is effected, further brake pipe reduction is made through the brake valve device at a slower rate than the initial reduction, the slower rate of brake pipe reduction being sufficient to cause the brakes to be applied with a greater predetermined force.

Figure 6:
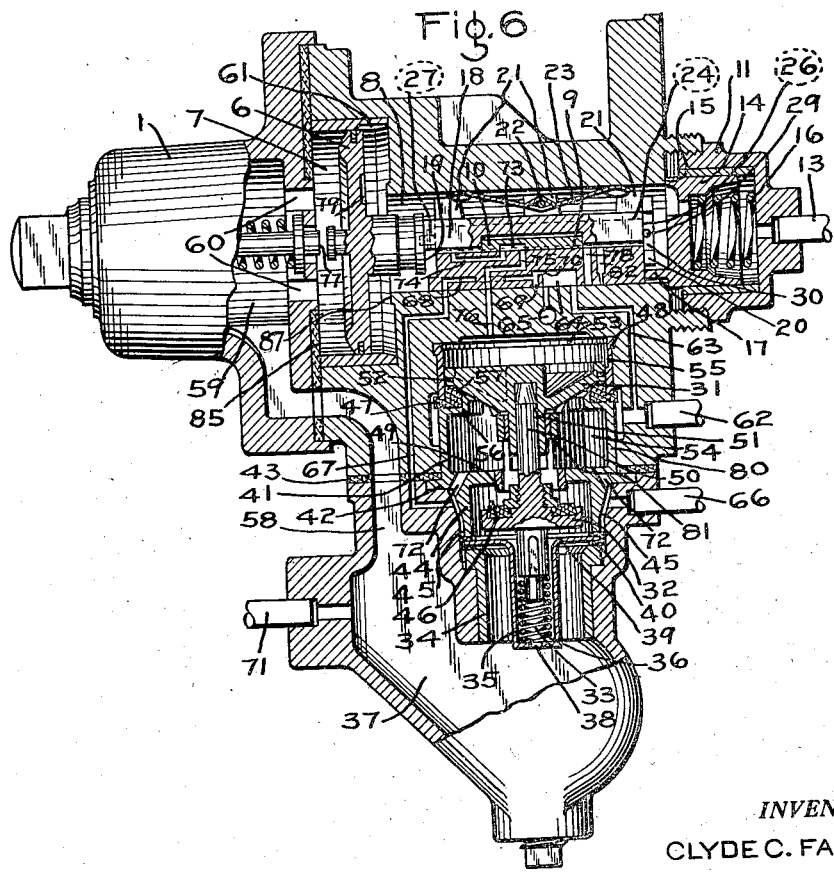

In the accompanying drawings; Fig. 1 is a diagrammatic, sectional view of a fluid pressure brake equipment embodying my invention and showing the triple valve device in release position; Fig. 2 is an enlarged fragmentary sectional view of a portion of the triple valve device taken on the line 2—2 of Fig. 1; Fig. 3 is an enlarged, fragmentary, sectional view of a portion of the triple valve device taken on the line 3—3 of Fig. 1; Fig. 4 is an enlarged, fragmentary sectional view of a portion of the triple valve device taken on the line 4—4 of Fig. 1; Fig. 5 is a fragmentary, sectional view of the triple valve device showing the parts as positioned after the initial movement of the triple valve piston to effect the closure of the feed groove; and Fig. 6 is a sectional view of the triple valve device showing the parts in the quick service position.

As shown in the drawings, the fluid pressure brake equipment comprises a triple valve device 1 or other brake controlling valve device, an auxiliary reservoir 2, a brake cylinder 3, a quick service reservoir 4 and a brake pipe 5.

The triple valve device 1 may be of any well known type adapted to control the brakes in accordance with variations in pressure in the brake pipe, but for the purpose of illustration the invention is associated with a triple valve device of the retarded release type.

The triple valve device 1 comprises a casing containing a piston 6 having at one side a chamber 7 connected to the brake pipe 5 and having at the other side a valve chamber 8 containing a main slide valve 9 and a graduating valve 10 adapted to be operated by said piston. The outer end of valve chamber 8 is closed by the usual cap nut 11 through which communication is established by way of passage 12 to a pipe 13 leading to the auxiliary reservoir 2. Mounted in the cap nut 11 is the usual retarded release device comprising a movable stop 14 normally pressed into engagement with a shoulder 15 in the casing by means of a spring 16 and having a finger 17 adapted to engage one end of the main slide valve 9 in the full release and retarded release positions of said slide valve.

The graduating slide valve 10 is slidably seated on the main slide valve 9 and is operatively disposed in a suitable recess in a stem 18 projecting from the piston 6. The piston stem 18 is provided with a shoulder 19 and the outer end of the stem is provided with a spider 30 having a plurality of radial arms 20 slidably engaging the wall of valve chamber 8. Between the spider and shoulder 19, the main slide valve 9 is loosely disposed in the well known manner.

The main slide valve 9 is provided with the usual wings or projections 21 on each side of the piston stem 18, and a leaf spring 23 is supported intermediate its ends by a pin 22 carried by oppositely disposed wings 21, the ends of said spring engaging the wall of valve chamber 8 so as to resiliently press the main slide valve 8 into engagement with its seat with a predetermined light force which is merely adapted to hold said slide valve in engagement with its seat when the brake system is void of fluid under pressure, as during shipment of the triple valves.

Carried by the wings 21, preferably on each side of the main slide valve 9, is a resistance device comprising a hollow tube-like member 24 open at one end and containing a spring 25 and a slidable plunger 26 subject to the pressure of said spring. The plunger 26 is provided with a stem 27 surrounded by spring 25 and extending through an opening in the closed end of the member 24. A pin 28 or other securing means is inserted through a hole in the end of stem 27 outside of member 24 for limiting the outward movement of the plunger 26 by the initial pressure of spring 25. In other words, the pin 28 fixes the normal position of plunger 26 in relation to a pin 29 carried by the piston stem spider 30. The pin 29 is so arranged that the inner edge is preferably in alignment with the inner face of the spider 30 and the pin is also in alignment with the plungers 26 so as to engage and move said plungers, as will be more fully explained hereinafter.

The casing of the usual retarded release type of triple valve device comprises a main body section containing principally the triple valve parts above described and a check valve section, said sections being secured to each other and having a gasket 43 interposed between. A chamber is provided in each of said casing sections and these chambers are in alignment and contain the usual quick action mechanism comprising a piston, a vent valve and a check valve. In carrying out the invention, I retain the quick action piston 31, the vent valve 32, the vent valve closing spring 33 and the check valve seat bushing 34, but in operation, the parts perform a different function than heretofore and are controlled in a different manner and consequently hereinafter will be called the quick service mechanism.

Carried by the usual seat bushing 34 in the check valve portion of the casing is a device 35 having a chamber 36 containing spring 33 and connected to the usual brake pipe chamber 37 through a port 38. The device is provided with an annular flange 39 engaging on each side a resilient seal preferably in the form of a U-shaped gasket 40 fitted over the edge of the flange 39.

A valve cage 41 is provided with an annular flange 42 which is clamped in a suitable recess in the lower casing section by engagement with the usual gasket 43. Said cage has a hollow cylindrical portion 44 extending into sealing engagement with the U-shaped gasket 40 so as to form an annular chamber 45 surrounding the exterior of said portion and a chamber 46 within said portion.

The valve cage has an upwardly extending portion 80, carrying on its outer edge a gasket 47 adapted to effect sealing engagement with the end of the bushing 48 in which is slidably mounted the quick service piston 31. The vent valve 32 is contained in the chamber 46 and is normally pressed into sealing engagement with a seat rib 49 in the valve cage 41 by means of the spring 33.

The quick service piston 31 has a stem 51 slidably mounted in a suitable bore in ring 81 carried by the valve cage 41, and said stem is provided with a bore adapted to receive the stem 50 of the vent valve 32. Said stem 50 at all times engages the bottom of the bore in piston stem 51 so as to provide operative engagement between the piston 31 and vent valve 32.

Fluid under pressure is liable to leak from valve chamber 8 past the slide valves 9 and 10 to chamber 53 at one side of the quick service piston 52. In order to prevent such leakage from building a pressure in chamber 53 and possibly causing undesired operation of the quick service mechanism, a leakage groove 55 of predetermined size is provided for connecting the opposite sides of the piston 31 and in order to ensure positive and uniform operation of the quick service mechanism, as will be hereinafter described, the piston 31 is provided with a packing ring 52.

The gasket 47 between the piston bushing 48 and valve cage 41 extends inwardly as limited by the L-shaped flange 56 on the valve cage 41, and also extends upwardly within the piston bushing 48 so as to form a sealing edge 57. The lower face of the quick service piston is conical-shaped, the degree of angle of said face being such that when the piston is moved downwardly it will engage and seal on the sealing edge 57 of the gasket 47.

In operation, to initially charge the brake equipment, fluid under pressure is supplied to brake pipe 5 in the usual manner and from thence flows through branch pipe 71 to chamber 37 in the triple valve device. From chamber 37 fluid under pressure flows through passage 58, chamber 59, and ports 60 to the triple valve piston chamber 7.

With the triple valve piston 6 in full release position as shown in Fig. 1, fluid flows from chamber 7 through a feed groove 61 to valve chamber 8, and from thence through passage 12 and pipe 13 to the auxiliary reservoir 2, thereby charging valve chamber 8 and the auxiliary reservoir 2 to brake pipe pressure.

With the triple valve slide valves 9 and 10 in the full release position shown in Fig. 1, the brake cylinder 3 is connected to the atmosphere in the usual manner through a pipe 62, a passage 63, the usual full release exhaust cavity 64 in the main slide valve 9 and the atmospheric passage 65. The quick service reservoir 4 is also connected to the atmosphere through pipe and passage 66, chamber 45 surrounding the lower portion of the valve cage 41, passage 67 and port 68 in the main slide valve 9, which port connects to the usual retarded release exhaust cavity 69 in the main slide valve, the cavity 69 being open to the atmosphere through the usual retarded release choke 70, full release exhaust cavity 64 and atmospheric passage 65. Chamber 54 at the lower side of the quick service piston 31 being open to the vented chamber 45 through ports 72 is normally open to the atmosphere as well as chamber 53 at the other side of the quick service piston 31, chamber 53 being connected to chamber 54 through the leakage groove 55. With the quick service piston 31 thus subject on its opposite faces to atmospheric pressure, the pressure of spring 33 holds the vent valve 32 in engagement with the seat rib 49 and fluid at brake pipe pressure builds up in the vent valve chamber 46 due to flow from chamber 37 through port 38 in the end of the device 35.

With the triple valve piston 6 and slide valves 9 and 10 in the full release position in which shoulder 19 on the piston stem 18 engages the end of the main slide valve 9, it will be noted that the spider 30 and the pin 29 carried by said spider are moved away from the spring-pressed plungers 26 carried by the slide valve 9. This is clearly shown in Fig. 2 and in this release position the springs 25 maintain the plungers 26 in the outer positions as fixed by the engagement of the plunger retaining pins 28 with the end of the spring tubes 24.

If it is desired to effect a service application of the brakes, fluid under pressure is gradually vented from the brake pipe 5 and the connected triple valve piston chamber 7 by operation of the usual brake valve device (not shown). When the pressure in piston chamber 7 is thus reduced slightly below auxiliary reservoir pressure acting in valve chamber 8, as for example less than one pound, the piston 6 moves and closes the feed groove 61. This movement of piston 6 moves the graduating valve 10 relative to the main slide valve 9 and at substantially the same time as the feed groove is closed, the pin 29 in the piston stem spider 30 engages the end of the spring-pressed plungers 26, as shown in Fig. 5. Further movement of the piston 6 is then resisted by the springs 25, but when the brake pipe pressure is reduced a predetermined but light amount, for example, a reduction of one pound, the resistance of springs 25 is overcome, permitting the piston 6 to move the graduating valve 10 to quick service position, as shown in Fig. 6, without moving the main slide valve 9 from the full release position.

In the quick service position of graduating valve 10, a cavity 73 connects port 74 in the main valve to port 75 in the main valve. In full release position of the main slide valve 9, port 75 registers with passage 76, and since port 74 is at all times open to the valve chamber 8, fluid at auxiliary reservoir pressure is permitted to flow through port 74, cavity 73, port 75 and passage 76 to the quick service piston chamber 53.

The pressure of fluid supplied to the quick service piston chamber 53 moves the piston 31 downwardly into engagement with the sealing edge 57 of gasket 47 so as to prevent leakage of fluid under pressure from chamber 53 to chamber 54.

The movement of the quick service piston 31 moves the vent valve 32 out of engagement with seat rib 49, thereby venting fluid under pressure from the chamber 46 to chamber 54 and permitting flow of fluid under pressure from the brake pipe 5 through pipe 71, chamber 37, choke 38 and spring chamber 36 in device 35, vent valve chamber 46, past the vent valve 32 to chamber 54 and from thence through ports 72, chamber 45 and passage and pipe 66 to the quick service reservoir 4. This venting of fluid from the brake pipe 5 to the quick service reservoir 4 produces a definite local reduction in brake pipe pressure before the triple valve parts move to service position. This local reduction is rapidly transmitted to the next car of the train, causing the triple valve on said next car to act in a similar manner, and so on throughout the length of the train. As a consequence, serial quick service action takes place in advance of the application of brakes on each car.

When the brake pipe pressure in piston chamber 7 is reduced by operation of the brake valve device and quick service venting of fluid under pressure from the brake pipe, the triple valve piston 6 and slide valves 9 and 10 are positively moved to service position on each car, in which position the piston 6 engages a spring-pressed stop 77, and a service port 78 registers with passage 63. The service port 78 is uncovered by the movement of the graduating valve 10 to quick service position, so that in service position of the main slide valve 9, fluid under pressure is permitted to flow from valve chamber 8 and the connected auxiliary reservoir 2 through port 78, passage 63 and pipe 62 to the brake cylinder 3 and apply the brakes.

The movement of the main slide valve 9 from quick service position shown in Fig. 5 to service position laps the passage 76 leading to the quick service piston chamber 53. Consequently, fluid under pressure supplied to said chamber is bottled up with the piston 31 engaging the sealing edge 57 of gasket 47. This maintains the vent valve 32 open and permits substantial equalization of pressures in the brake pipe 5 and quick service reservoir 4 so as to ensure a positive, local quick service reduction in brake pipe pressure. Upon obtaining such equalization, the pressure in the quick service reservoir, acting in chamber 54 on the lower face of the quick service piston 31, is increased by the equalization of brake pipe pressure into said reservoir to such an extent that the pressure acting on the exposed area of the lower face of piston 31 plus the pressure of spring 33 is sufficient to overcome the pressure of fluid acting in chamber 53 above the piston and move valve 32 to its seat and piston 31 to its normal position shown in Fig. 1. In this position of piston 31 leakage groove 55 is opened so as to permit the release of fluid under pressure from chamber 53 in releasing the brakes, as will be hereinafter described.

As hereinbefore described, the venting of fluid under pressure from the brake pipe to the quick service chamber 4 occurs through the choke 38 in the device 35 and the size of this choke, which controls the rate of quick service venting of fluid under pressure from the brake pipe, is such as will not permit a sufficiently rapid reduction in brake pipe pressure as to cause an emergency application of the brakes as will be hereinafter described. Furthermore, it so restricts the rate of build up of pressure in chamber 54 below the quick service piston 31 as to ensure said piston remaining in quick service position during the quick service action.

As hereinbefore described, when the main slide valve is in release position, the quick service reservoir 4 is open to the atmosphere through pipe and passage 66, chamber 45, passage 67, port 68 in the main slide valve, cavity 69, choke 70, cavity 64 and atmospheric passage 65, and since the main slide valve remains in release position when the brake pipe is connected to the quick service reservoir to effect a quick service reduction in brake pipe pressure, there will be a slight flow of fluid under pressure from the brake pipe to the atmosphere. This flow to the atmosphere is so restricted however by the retarded release choke 70 in the main slide valve that its effect does not interfere with the desired operation. In service position of the main slide valve 9, passage 67 is lapped so as to prevent venting of fluid under pressure from the brake pipe and quick service reservoir.

When the auxiliary reservoir pressure is reduced by flow to the brake cylinder to a degree slightly less than the reduced brake pipe pressure, the piston 6 moves the graduating valve 10 back to service lap position in which the service port 78 is lapped so as to cut off the supply of fluid under pressure to the brake cylinder.

Upon increasing the brake pipe pressure to effect the release of the brakes, the triple valve piston 6 is operated to shift the graduating valve 10 and main slide valve 9 back to the full release position shown in Fig. 1, in which position the auxiliary reservoir 2 is recharged with fluid under pressure and fluid under pressure is vented from the brake cylinder 3 and quick service reservoir through the connections hereinbefore described. At the head end of the train, the rate of increase in brake pipe pressure usually exceeds that in the rear portion of the train to such a degree as to shift the triple valve parts to the usual retarded release position against the pressure of spring 16. In the retarded release position, the charging of the auxiliary reservoir 2 is restricted, since the piston 6 engages a seat rib 87 so that the flow of fluid under pressure to the auxiliary reservoir is restricted to the capacity of a feed groove 79 in the piston, which feed groove is of smaller area than the full release feed groove 61. Also, in retarded release position the retarded release exhaust cavity 69 in the main slide valve registers with the atmospheric passage 65 so that the release of fluid from the brake cylinder 4 is restricted by the choke 70. Passage 67 through which fluid under pressure is vented from the quick service reservoir 4 is lapped by the main slide valve in retarded release position, so that toward the front end of the train, fluid under pressure is bottled in the quick service reservoir until the auxiliary reservoir pressure is built up to substantially the brake pipe pressure, at which time the retarded release spring 16 shifts the piston 6 and slide valves 9 and 10 to full release position shown in Fig. 1. In this position the quick service reservoir is vented as hereinbefore described.

If it is desired to effect an emergency application of the brakes, a sudden reduction in brake pipe pressure is effected, permitting auxiliary reservoir pressure to move the piston 6 and slide valves 9 and 10 from the full release position to emergency position, in which the piston 6 engages a gasket 85. In this position fluid under pressure is supplied from the auxiliary reservoir 2 and valve chamber 8 through the emergency port 82 in the main slide valve, passage 63 and pipe 62 to the brake cylinder 3. The quick service operation is ineffective in effecting an emergency application of the brakes for the reason that the brake pipe pressure is reduced so rapidly, as for instance by a vent valve (not shown) on each car, that the triple valve rapidly moves from the release position directly to the emergency position.

Upon an increase in brake pipe pressure to effect a release of the brakes after an emergency application, the triple valve parts are moved from emergency position to release position in which the auxiliary reservoir is charged with fluid under pressure from the brake pipe, and the brake cylinder and quick service reservoir are connected to the atmosphere in the manner hereinbefore described.

From the above description of the invention, it will be noted that in effecting a service application of the brakes, the triple valve piston is promptly operated upon a light reduction in brake pipe pressure to close the feed groove so as to cut off the back flow of fluid under pressure from the auxiliary reservoir to the brake pipe. When the feed groove is thus closed, resistance means carried by the main slide valve become effective to prevent further movement of the piston to quick service position until a a definite, predetermined light reduction in brake pipe pressure is obtained. A definite quick service action is ensured even though the triple valve device does not remain in quick service position until equalization of the brake pipe into the quick service reservoir because fluid under pressure is bottled in the chamber at the operating side of the quick service piston in case the triple valve parts move to service position before such equalization occurs.

In releasing the brakes after a service application, the quick service reservoir is vented to the atmosphere through the usual retarded release choke 70. This is desirable in that said choke so restricts the flow of fluid under pressure from the quick service reservoir in effecting a quick service reduction in brake pipe pressure as to render the loss of fluid under pressure through said choke inappreciable so as not to have any detrimental effect upon the desired quick service action. It will be evident that if the choke 70 were not so employed, but instead the quick service reservoir were open to the atmosphere through an unrestricted opening, there would be no control or regulation of the degree of quick service reduction in brake pipe pressure.

It will be understood that the feature of stabilizing the quick service action of a brake controlling valve device is broadly covered in my copending application, Serial No. 612,465, filed May 20, 1932, which is in part a continuation of my copending application, Serial No. 473,323, filed August 6, 1930, and that the claims in the present application which relate to this feature, as controlled by the springs 25, plungers 26, and pin 29, are intended to cover a specific type of stabilizing mechanism which is particularly designed to be associated with a retarded release type of triple valve, such as a K type, without necessitating any change in the piston and retarded release mechanism of the triple valve device as would be required to incorporate a design such as disclosed in my pending application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a triple valve device comprising a slide valve and a piston movable relative to said slide valve and operated upon a reduction in brake pipe pressure for actuating said slide valve, of yielding means carried by said slide valve for opposing movement of said piston only after a predetermined relative movement of said piston to said slide valve.

2. In a fluid pressure brake, the combination with a brake pipe and a triple valve device comprising a main valve, a graduating valve having a movement relative to said main valve and a piston operated upon a reduction in brake pipe pressure for operating said valves, of yielding means carried by said main valve and operative upon said piston only after a predetermined relative movement of said graduating valve to resist further movement of said piston and thereby said graduating valve.

3. In a fluid pressure brake, the combination with a brake pipe and a triple valve device comprising a main valve, a graduating valve movable relative to said main valve, a piston, a stem projecting from said piston for operating said graduating valve, and means on said stem adapted to operate said main valve, of a plunger carried by said main valve and adapted to be engaged by said means after a predetermined movement of said graduating valve, and a spring for opposing movement of said plunger.

4. In a fluid pressure brake, the combination with a brake pipe and a triple valve device comprising a main valve, a graduating valve movable relative to said main valve, a piston, a stem projecting from said piston for operating said graduating valve, and means on said stem adapted to operate said main valve, of a plurality of plungers carried by said main valve and adapted to be engaged by said means after a predetermined movement of said graduating valve, and a plurality of springs for opposing movement of said plungers.

5. In a fluid pressure brake, the combination with a brake pipe and a triple valve device comprising a main valve, a graduating valve movable relative to said main valve, a piston, a stem projecting from said piston for operating said graduating valve, and means on said stem adapted to operate said main valve, of a plunger carried on each side of said slide valve and adapted to be engaged by said means upon a predetermined movement of said graduating valve, and a spring acting on each plunger.

6. In a fluid pressure brake, the combination with a brake pipe and a triple valve device comprising a main valve having a wing on each side, a graduating valve movable relative to said main valve, a piston, a stem projecting from said piston for operating said graduating valve, and means on said stem adapted to operate said main valve, of a tube secured to each wing of the main valve, a plunger slidably mounted in each tube adapted to be engaged by said means upon a predetermined movement of said graduating valve, and a spring in each tube acting on the plunger in said tube.

7. In a fluid pressure brake, the combination with a brake pipe and an auxiliary reservoir, of a triple valve device comprising a piston for controlling a feed passage through which fluid under pressure is supplied from said brake pipe to said auxiliary reservoir, a main valve movable by said piston, a graduating valve associated with said main valve and operative upon movement of said piston relatively to said main valve for effecting a reduction in brake pipe pressure, and resilient means carried by said main valve for opposing said relative movement after said feed passage is closed by said piston.

8. In a fluid pressure brake, the combination with a brake pipe and a quick service reservoir, of a triple valve device comprising a main valve having a release position, a passageway in said main valve for establishing communication from said quick service reservoir to the atmosphere, a choke in said passageway, valve means operated by fluid under pressure to vent fluid under pressure from said brake pipe to said quick service reservoir, and a graduating valve movable relative to said main valve upon a reduction in brake pipe pressure to supply fluid under pressure for operating said valve means.

9. In a fluid pressure brake, the combination with a brake pipe and a brake cylinder, of a triple valve device comprising a main valve, a graduating valve having a movement relative to said main valve, and a piston for operating said valves, said main valve having a full release cavity through which communication is established from said brake cylinder to the atmosphere and a retarded release cavity through which communication is established from the brake cylinder to the atmosphere by way of said full release cavity, a choke for controlling flow of fluid from said retarded release cavity to said full release cavity, and a quick service reservoir communicating with said retarded release cavity only when said brake cylinder is connected to the atmosphere through said full release cavity, said piston being operative upon a reduction in brake pipe pressure to effect said relative movement for effecting communication from the brake pipe to said quick service reservoir.

10. In a fluid pressure brake, the combination with a brake pipe, of valve means comprising a piston operated by fluid under pressure for effecting a quick service reduction in brake pipe pressure, a seal engageable by said piston for preventing leakage of fluid supplied to said piston, and a brake controlling valve device comprising a main valve, a graduating valve having a movement relative to said main valve and a piston operative upon a predetermined reduction in brake pipe pressure to effect said relative movement for supplying fluid under pressure for operating the first mentioned piston, and operative upon a further reduction in brake pipe pressure to move said main valve for cutting off the supply of fluid under pressure to said first mentioned piston and for effecting an application of the brakes.

11. In a fluid pressure brake, the combination with a brake pipe, a quick service reservoir and valve means comprising a valve for venting fluid under pressure from said brake pipe to said quick service reservoir, a quick service piston operated by fluid under pressure for opening said valve and a seal engageable by said quick service piston for preventing leakage of fluid under pressure supplied to operate said quick service piston, of a brake controlling valve device comprising a main valve having a full release position and a passageway for connecting said quick service reservoir to the atmosphere in said position, a choke in said passageway, a graduating valve movable relative to said main valve for supplying fluid under pressure for operating said quick service piston, and a piston operative upon a predetermined reduction in brake pipe pressure for effecting said relative movement and upon a further reduction in brake pipe pressure to move said main valve to cut off the supply of fluid under pressure to said quick service piston and to close communication between said quick service reservoir and said passageway.

12. In a fluid pressure brake, the combination with a brake pipe and a quick service reservoir, of a valve for venting fluid under pressure from said brake pipe to said quick service reservoir, a piston movable from a normal position by fluid under pressure for opening said valve, said piston being subject on one side to the pressure of fluid supplied to said quick service reservoir, means operative upon substantial equalization of pressures in said brake pipe and quick service reservoir for closing said valve and for moving said piston to normal position, a leakage groove controlled by said piston for connecting the opposite sides of said piston in normal position and a brake controlling valve device operative upon a reduction in brake pipe pressure to supply fluid under pressure for operating said piston and upon an increase in brake pipe pressure to vent fluid under pressure from said quick service reservoir.

13. In a fluid pressure brake, the combination with a brake pipe and a quick service reservoir, of a valve for venting fluid under pressure from said brake pipe to said quick service reservoir, a piston movable from a normal position by fluid under pressure for opening said valve, said piston being subject on one side to the pressure of fluid supplied to said quick service reservoir, a seal engageable by said piston for preventing leakage of operating fluid under pressure to said quick service reservoir, means operative upon substantial equalization of pressures in said brake pipe and quick service reservoir for closing said valve and for moving said piston to normal position, a leakage groove controlled by said piston for connecting the opposite sides of said piston in normal position, and a brake controlling valve device operative upon a reduction in brake pipe pressure to supply fluid under pressure for operating said piston and upon an increase in brake pipe pressure to vent fluid under pressure from said quick service reservoir.

14. In a fluid pressure brake, the combination with a brake pipe, a brake cylinder and a quick service reservoir, of a brake controlling valve device comprising two casing sections containing a quick service valve mechanism operated by fluid under pressure for connecting said brake pipe to said quick service reservoir, and a triple valve mechanism for supplying fluid under pressure for operating said quick service valve mechanism and for venting fluid under pressure from said quick service reservoir, a gasket interposed between said casing sections, said quick service valve mechanism comprising a cylinder, a piston mounted in said cylinder, a groove in the wall of said cylinder controlled by the movement of said piston, a cage having a flange carried between said casing sections and engaging said gasket, and having a hollow projection open at one end, a gasket carried by the open end of said projection and effecting sealing engagement with one end of the piston cylinder and adapted to be engaged by said piston, said projection and gaskets forming an outer chamber communicating with said brake cylinder and said projection having an inner chamber communicating with said quick service reservoir, said cage having another projection, a spring seat having a choked port, a gasket carried by said spring seat and effecting sealing engagement with the last mentioned cage projection, thereby forming a chamber between said projection and the casing in communication with said quick service reservoir and said inner chamber, an apertured partition wall in said cage separating said inner chamber from a vent valve chamber formed within the second mentioned projection, a seat rib surrounding the aperture, a valve contained in said vent valve chamber and having operative engagement with said piston, and a spring carried by said spring seat for urging said valve into engagement with said seat rib.

15. In a fluid pressure brake, the combination with a main valve, of a graduating valve associated with said main valve and movable relatively to said main valve, a member for first moving said graduating valve relatively to said main valve and for then moving said main valve, resilient means carried by said main valve, and means controlled by said resilient means and operative to oppose a portion of the movement of said member relatively to said main valve.

16. In a fluid pressure brake, the combination with a brake pipe and a chamber, of a valve device comprising a main valve, a graduating valve associated with said main valve and movable relatively thereto to a position for venting fluid under pressure from said brake pipe, a piston for moving said valves and movable relatively to said main valve a predetermined distance for first closing a feed passage from the brake pipe to said chamber and for then moving said graduating valve to said position, a member carried by said main valve and resilient means operative on said member for opposing further movement of said piston after the closing of said feed passage.

CLYDE C. FARMER.